(12) United States Patent
Hino

(10) Patent No.: US 9,256,046 B2
(45) Date of Patent: Feb. 9, 2016

(54) VIBRATION ACTUATOR AND OPTICAL APPARATUS

(75) Inventor: Mitsuteru Hino, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/342,203

(22) PCT Filed: Aug. 31, 2012

(86) PCT No.: PCT/JP2012/072244
§ 371 (c)(1),
(2), (4) Date: Feb. 28, 2014

(87) PCT Pub. No.: WO2013/031983
PCT Pub. Date: Mar. 7, 2013

(65) Prior Publication Data
US 2014/0218815 A1 Aug. 7, 2014

(30) Foreign Application Priority Data
Sep. 1, 2011 (JP) ................................. 2011-190750

(51) Int. Cl.
*G02B 7/02* (2006.01)
*H02N 2/00* (2006.01)
(Continued)

(52) U.S. Cl.
CPC .. *G02B 7/04* (2013.01); *G02B 7/02* (2013.01); *G03B 3/10* (2013.01); *H02N 2/001* (2013.01);
(Continued)

(58) Field of Classification Search
CPC ........... H02N 2/00; H02N 2/001; H02N 2/02; H02N 2/103; H02N 2/12; H02N 2/163; H02N 2/004; H02N 2/006; H02K 7/00; H02K 7/063; H02K 7/085; H02K 2205/03; H02K 2211/03; G02B 7/02; G02B 7/04; G02B 15/14; G02B 7/08; G02B 7/09; G02B 7/10; Y10T 74/18856; G03B 3/10; G03B 2205/0061; H01L 41/0913
USPC ........ 359/694–701, 823, 824; 310/25, 51, 90, 310/254.1, 323.01–323.05, 323.16, 323.17, 310/257
See application file for complete search history.

(56) References Cited

U.S. PATENT DOCUMENTS 5,189,331 A 2/1993 Mukohjima et al.
5,216,314 A * 6/1993 Suzuki ..................... 310/323.05
(Continued)

FOREIGN PATENT DOCUMENTS

JP S62-68493 U 4/1987
JP A-63-103675 5/1988
(Continued)

OTHER PUBLICATIONS

International Search Report issued in International Patent Application No. PCT/JP2012/072244 dated Oct. 30, 2012.
(Continued)

*Primary Examiner* — Loha Ben
(74) *Attorney, Agent, or Firm* — Oliff PLC

(57) ABSTRACT

To reduce the length of the lens barrel, a vibration actuator has a vibrating element, a rotor, a pressing portion, a rotor holder that restricts a position of the rotor in the thrust and radial direction, and a bearing of which a rotation axis is coaxial with the axis of the vibrating element. The rotor holder includes an outer flange to receive the pressure force from the rotor portion, and an inner flange to serve as a first track face of the bearing.

17 Claims, 4 Drawing Sheets

(51) Int. Cl.
*G02B 7/04* (2006.01)
*H02N 2/10* (2006.01)
*H02N 2/16* (2006.01)
*G03B 3/10* (2006.01)
*H02N 2/12* (2006.01)

(52) U.S. Cl.
CPC .............. *H02N 2/103* (2013.01); *H02N 2/12* (2013.01); *H02N 2/163* (2013.01); *G03B 2205/0061* (2013.01); *G03B 2205/0084* (2013.01); *H02K 2205/03* (2013.01); *H02K 2211/03* (2013.01)

(56) References Cited

U.S. PATENT DOCUMENTS

| | | | | |
|---|---|---|---|---|
| 5,335,115 | A | * | 8/1994 | Kawai et al. ............... 359/696 |
| 5,898,526 | A | * | 4/1999 | Yoshibe et al. ............ 359/696 |
| 5,966,248 | A | * | 10/1999 | Kurokawa et al. ......... 359/697 |
| 5,978,156 | A | * | 11/1999 | Okada et al. ............... 359/699 |
| 6,008,958 | A | * | 12/1999 | Ishikawa et al. ........... 359/824 |
| 6,085,044 | A | | 7/2000 | Kawanami .................. 396/134 |
| 6,288,848 | B1 | * | 9/2001 | Shinohara et al. ......... 359/696 |
| 6,437,471 | B1 | * | 8/2002 | Ogawara et al. ............. 310/90 |
| 6,982,513 | B2 | * | 1/2006 | Fujii et al. ................ 310/254.1 |
| 7,242,131 | B2 | * | 7/2007 | Kishi et al. ............. 310/323.02 |
| 7,268,464 | B2 | * | 9/2007 | Kishi ....................... 310/323.02 |
| 7,466,062 | B2 | * | 12/2008 | Sakatani et al. ......... 310/323.16 |
| 8,531,085 | B2 | * | 9/2013 | Hino ........................ 310/323.17 |
| 8,553,354 | B2 | * | 10/2013 | Kitamura et al. .......... 360/99.08 |
| 2010/0300222 | A1 | | 12/2010 | Hino |

FOREIGN PATENT DOCUMENTS

| | | |
|---|---|---|
| JP | U-2-64908 | 5/1990 |
| JP | A-2-206367 | 8/1990 |
| JP | A-2-206368 | 8/1990 |
| JP | A-2-253216 | 10/1990 |
| JP | A-7-218801 | 8/1995 |
| JP | H08-80072 A | 3/1996 |
| JP | A-9-308271 | 11/1997 |
| JP | A-2006-280139 | 10/2006 |
| JP | A-2011-10539 | 1/2011 |

OTHER PUBLICATIONS

Aug. 4, 2015 Office Action issued in Japanese Application No. 2011-190750.

Nov. 4, 2015 Office Action issued in Chinese Application No. 201280042275.0.

Nov. 17, 2015 Office Action issued in Japanese Application No. 2011-190750.

* cited by examiner

VIBRATION ACTUATOR AND OPTICAL APPARATUS

TECHNICAL FIELD

The present invention relates to a vibration actuator and an optical apparatus.

BACKGROUND ART

As a conventional art, for example, a vibration actuator for driving a moving element by using an electromechanical conversion element has been known (Patent Document 1), in which, however, a bearing is arranged on an outer circumference, involving a problem that the sliding sound of the bearing is loud.

Meanwhile, the use of a plastic bearing has been proposed for the purpose of attenuating the sound of such a vibration actuator (Patent Document 2).

Patent Document 1: Japanese Unexamined Patent Application, Publication No. S63-103675

Patent Document 2: Japanese Unexamined Patent Application, Publication No. 2011-10539

DISCLOSURE OF THE INVENTION

Problems to be Solved by the Invention

The conventional vibration actuator described above is used for a lens barrel of a digital single-lens reflex camera. However, reduction of the size of the lens barrel has been required, and reduction of the overall length of the vibration actuator has been desired.

An object of the present invention is to provide a vibration actuator and an optical apparatus for making it possible to achieve reduction of the overall length of the lens barrel.

Means for Solving the Problems

To solve the problem, according to the first aspect of the invention, there is provided a vibration actuator, having a vibrating element that is excited by an electromechanical conversion element, a rotor portion that is relatively rotated by way of vibration of the vibrating element, a pressing portion that generates a pressure force in a thrust direction between the vibrating element and the rotor portion; a hollow rotor holder that restricts a position of the rotor portion in the thrust direction and a radial direction; and a bearing member of which a rotation axis is coaxial with a rotation axis of the vibrating element, wherein the rotor holder includes: an outer circumference flange that is provided on an outer circumference thereof to receive the pressure force from the rotor portion; and an inner circumference flange that is provided on an inner circumference thereof to serve as a first track face of the bearing member.

The rotor holder may have a cylindrical member between the outer circumference flange and the inner circumference flange, and the first track face facing the bearing member as well as a second track face being opposite to the first track face are arranged at an inner circumference of the cylindrical member of the rotor holder.

The vibration actuator may have a track member having the second track face facing the bearing member, wherein a contact face between the pressing portion and the track member may be arranged at the inner circumference of the cylindrical member of the rotor holder.

The vibration actuator may have a vibration absorber for absorbing the vibration of the rotor portion, the vibration absorber being provided between the rotor portion and the outer circumference flange of the rotor holder.

At least one of the first and second track faces facing the bearing member may be made of a plastic material.

The second track face facing the bearing member may be made of thermosetting resin.

A number of steel balls in the bearing member may be not an integral multiple of a wave number of progressive waves generated in the vibrating element.

The bearing member may be a thrust bearing.

According to the second aspect of the present invention, an optical apparatus, wherein an optical path is arranged within a hollow portion of the vibration actuator according to any one of above described vibration actuator is provided.

Effects of the Invention

The present invention achieves an effect of enabling reduction of the overall length of the vibration actuator.

EXPLANATION OF REFERENCE NUMERALS

Figure 1:
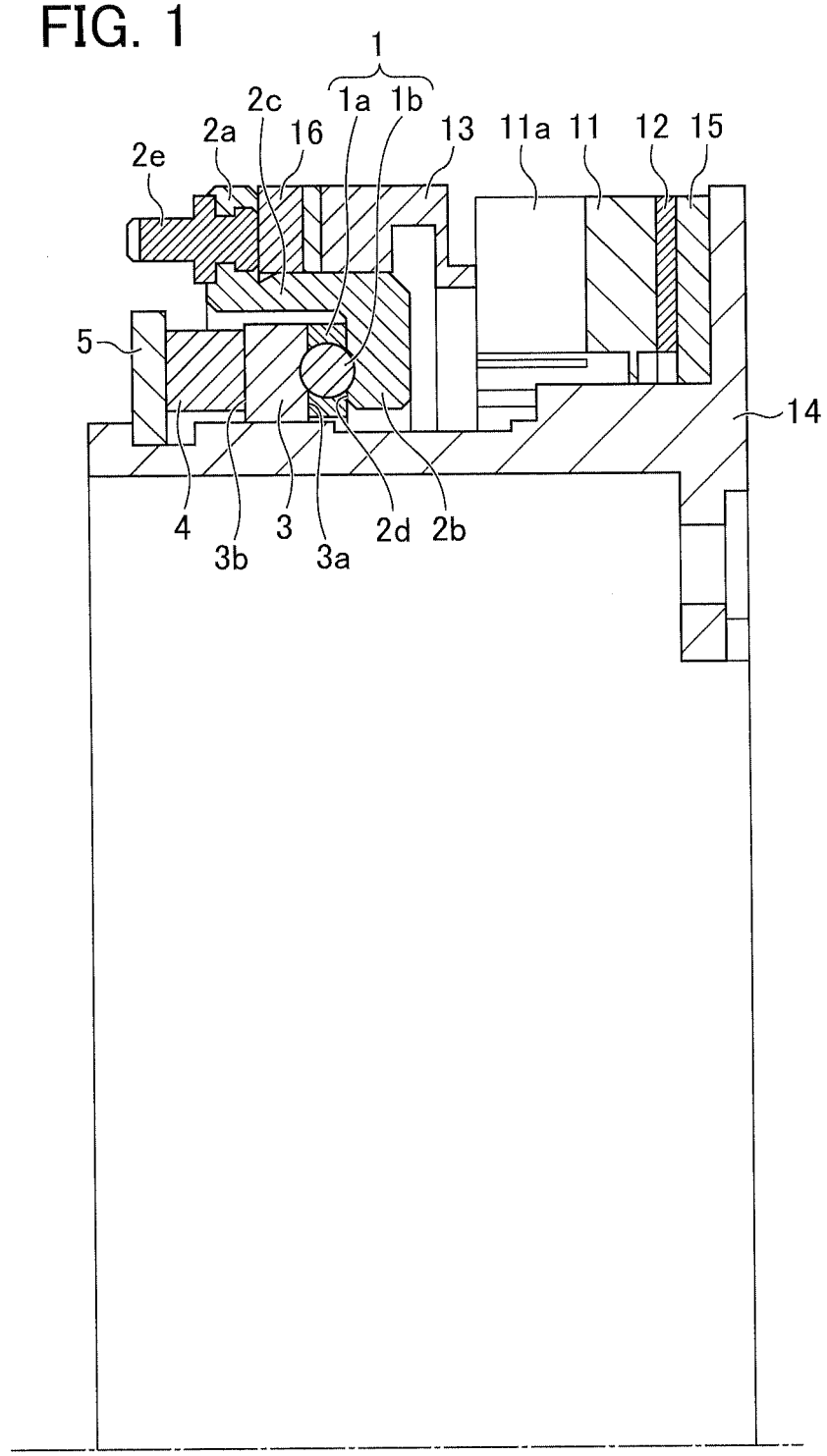
FIG. 1 is a detailed cross-sectional view showing an embodiment of a vibration actuator according to the present invention.
Figure 2:
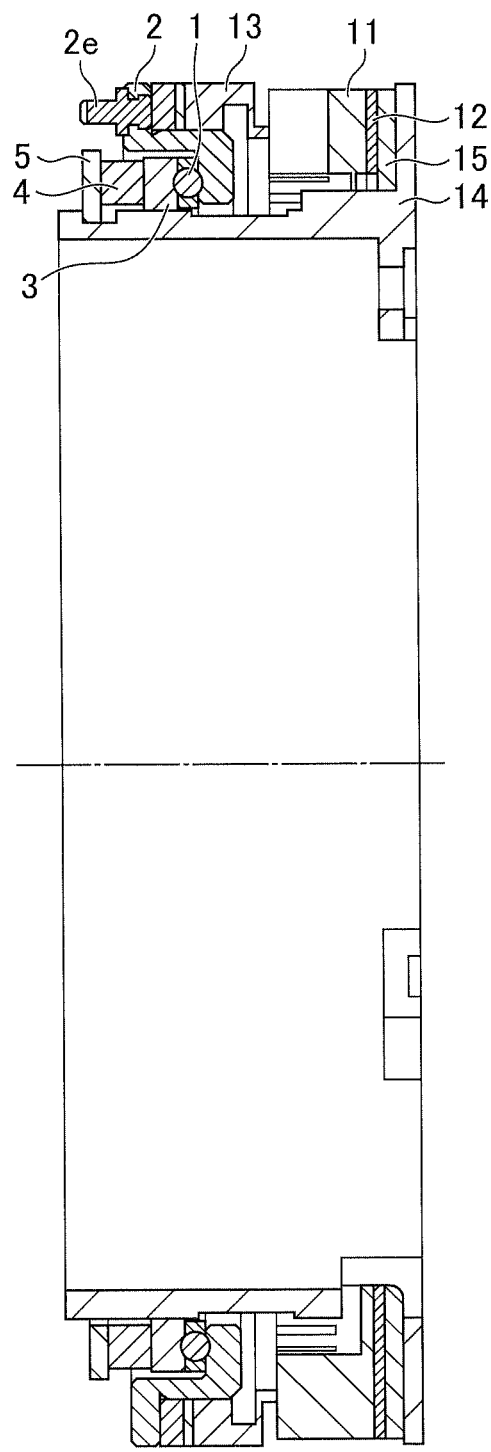
FIG. 2 is a cross-sectional view showing the embodiment of the vibration actuator according to the present invention.
Figure 3:
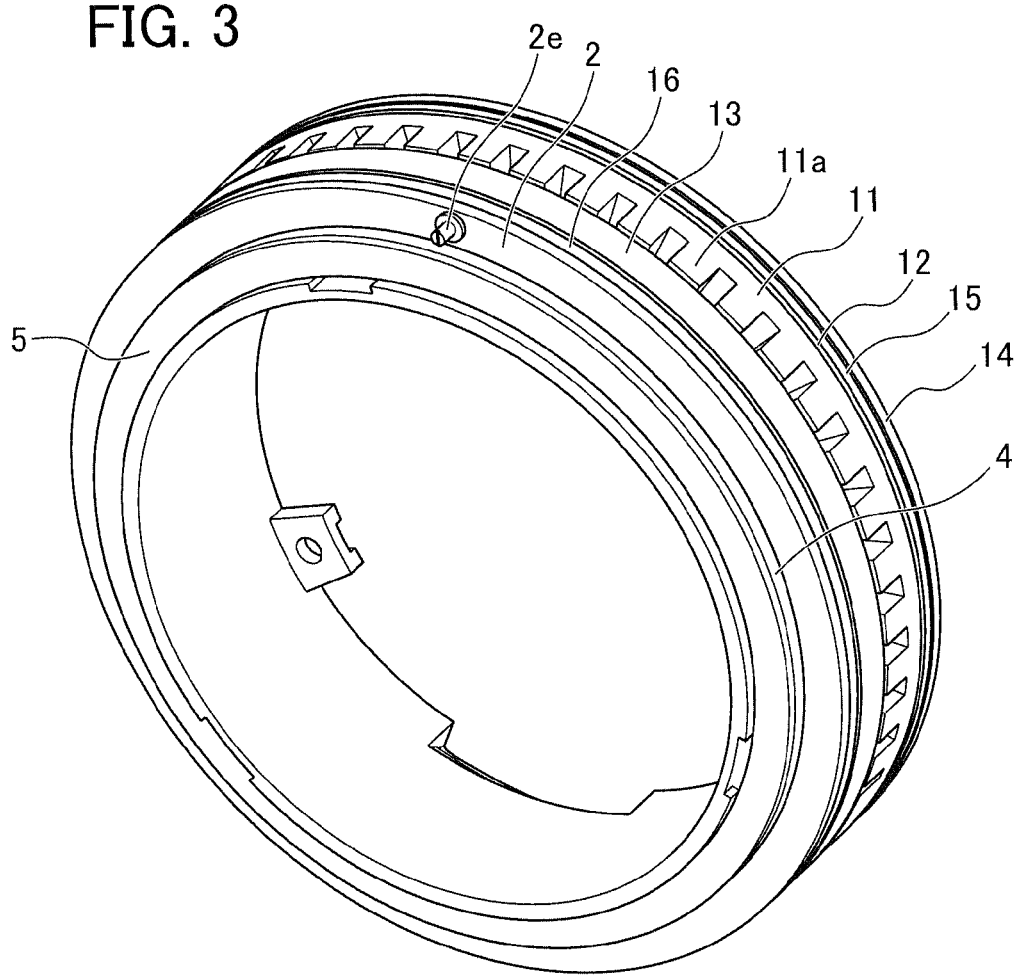
FIG. 3 is a perspective view showing the embodiment of the vibration actuator according to the present invention.

1: thrust bearing retainer unit, 1a: retainer, 1b: bearing steel ball, 2: rotor holder, 2a, 2b: flange, 2c: cylindrical member, 2d: track face, 2e: output extraction portion, 3: track body, 3a: track face, 3b: contact face 4: wave washer, 5: bayonet, 11: stator, 12: piezoelectric body, 13: rotor, 14: central cylinder, 15: buffer member 16: vibration absorber

PREFERRED MODE FOR CARRYING OUT THE INVENTION

A further detailed description of a preferred embodiment of the present invention is hereinafter provided with reference to the drawings.

First of all, the basic structure of a vibration actuator of the present embodiment is described.

The vibration actuator of the present embodiment includes a stator 11, a piezoelectric body 12, a rotor 13, a central cylinder 14, a buffer member 15, a vibration absorber 16, etc.

The stator 11 is a substantially annular member that is formed by using a ferroalloy such as a stainless steel material, an Invar material or the like, or an elastically deformable metallic material such as brass or the like; the piezoelectric body 12 is provided at one end face of the stator 11, and a comb portion 11a is formed by cutting a plurality of grooves at the other end face of the stator 11. The piezoelectric body 12 is excited to generate progressive waves on a tip face of the comb portion 11a that in turn serves as a driving surface for driving the rotor 13.

The piezoelectric body 12 has a function of converting electrical energy into mechanical energy. In the present embodiment, the piezoelectric body 12 is formed by using PZT (lead zirconium titanate), and is joined to the stator 11 by using an electrically-conductive adhesive or the like. Electrodes are formed on the piezoelectric body 12, and are electrically connected to a flexible printed circuit board (not shown). The piezoelectric body 12 is excited by a driving signal supplied from the flexible printed circuit board.

The rotor 13 is a substantially annular member. A pressure force of a wave washer 4 (to be described later) causes the rotor 13 to be in pressure contact with the driving surface of the stator 11. As a result, the rotor 13 is frictionally driven by way of the progressive waves of the stator 11.

The central cylinder 14 is a member for fixing the vibration actuator of the present embodiment to a lens barrel.

The buffer member 15 is a substantially annular member that is formed of a material such as rubber.

The buffer member 15 is a member for preventing the vibration of the stator 11 from being conveyed to the central cylinder 14. The buffer member 15 is provided between the stator 11 and the central cylinder 14.

The vibration absorber 16 is a substantially annular member that is formed of a material such as nonwoven fabric and felt. The vibration absorber 16 is a member for preventing the vibration of the rotor 13 from being conveyed to the wave washer 4. The vibration absorber 16 is provided between the rotor 13 and an outer circumference flange 2a of a rotor holder 2 (to be described later).

Next, the vibration actuator of the present embodiment is described in further detail.

Since the stator 11 is in pressure contact with the rotor 13, the vibration actuator converts the progressive waves generated at the rotor side face of the stator 11 into a rotational force, and conveys the rotational force to the rotor 13. If the vibration actuator does not appropriately receive this contact pressure, then the output drops, the performance worsens, and durability also worsens.

Therefore, the vibration actuator requires a bearing. For a hollow vibration actuator, there are two types of methods: the use of a large-scale thrust bearing, and the use of three miniature bearings, as the bearing. The miniature bearings are not suitable to the purpose of reducing the overall length. Accordingly, in the present embodiment, a large-scale thrust bearing, of a type in which a rotation axis of the vibration actuator coincides with a rotation axis of the thrust bearing, is employed for the purpose of attenuating the sound and reducing the overall-length.

In addition to the aforementioned basic structure, the vibration actuator of the present embodiment includes a thrust bearing retainer unit 1 (hereinafter referred to as a retainer unit), a rotor holder 2, a track body 3, a wave washer 4, a bayonet 5, etc.

Figure 4:
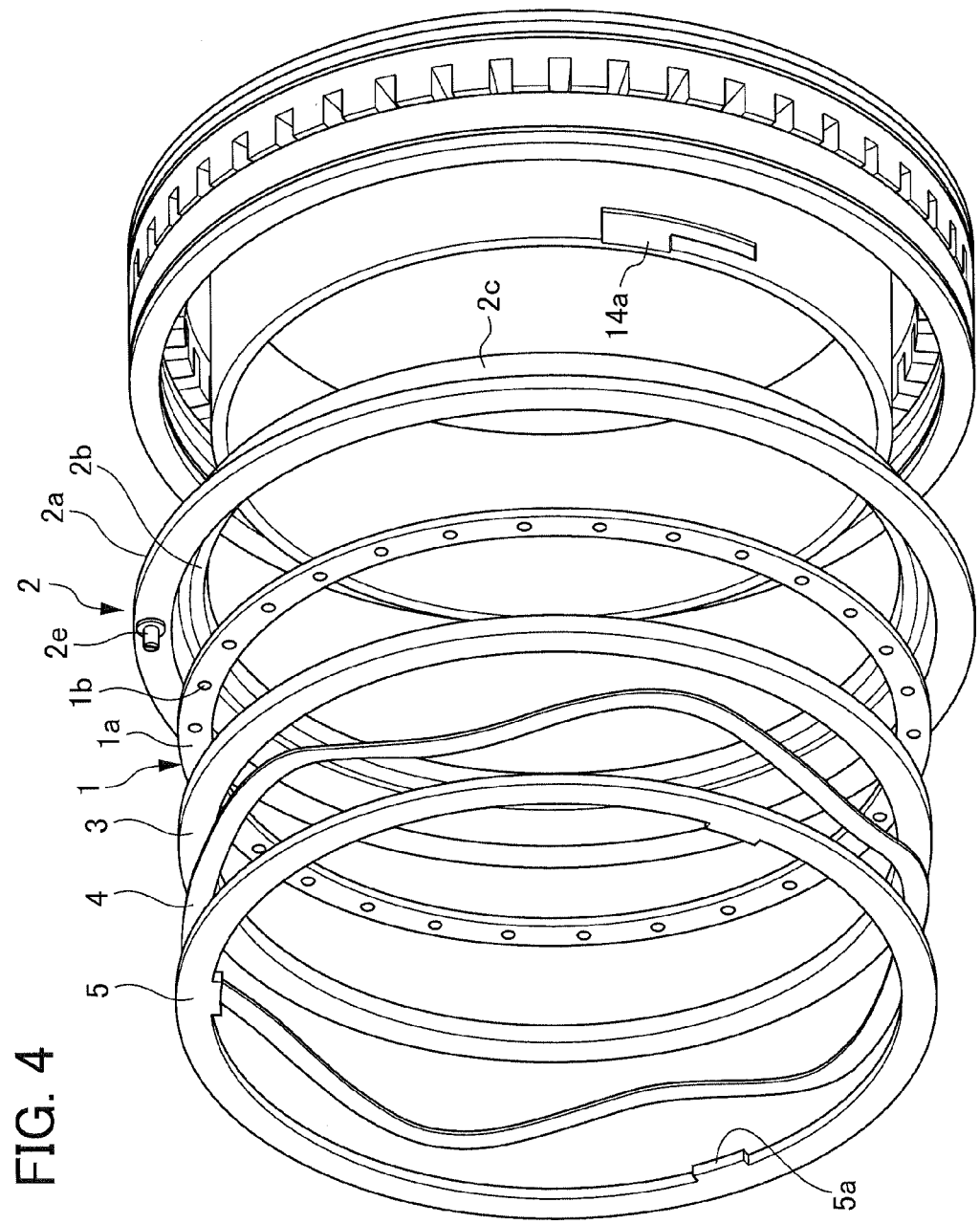
FIG. 4 is a partial exploded view showing the embodiment of the vibration actuator according to the present invention.

As shown in FIGS. 1 and 4, a rotation axis of the retainer unit 1 is coaxial with a rotation axis of the stator 11; and the retainer unit 1 is arranged inside an inner circumference of a cylindrical member 2c of the rotor holder 2. In the retainer unit 1, a plurality of bearing steel balls 1b are rotatably retained in a retainer 1a that is a doughnut-shaped plate member.

The rotor holder 2 is a hollow member for restricting the position of the rotor 13 in a thrust direction and a radial direction. The outer circumference flange 2a and inner circumference flange 2b are formed on both sides of the cylindrical member 2c. A track face 2d is a surface on the cylindrical member 2c side (inner side) of the inner circumference flange 2b. The outer circumference flange 2a receives a pressure force of the rotor 13, and is provided with an output extraction portion 2e for externally extracting an output.

The track body 3 is a doughnut-shaped plate member, and includes: a track face 3a on the retainer unit 1 side; and a contact face 3b on the wave washer 4 side.

The track face 3a and the contact face 3b are arranged inside the cylindrical member 2c of the rotor holder 2.

The wave washer 4 is a pressing member for causing the rotor 13 and the stator 11 to be in pressure contact with each other in the thrust direction.

The bayonet 5 is a doughnut-shaped plate member including three claw portions 5a formed on the inner circumference thereof. By engaging the claw portions 5a with grooves 14a (see FIG. 4) formed on the inner circumference surface of the inner cylinder 14, each of the aforementioned members can be fixed to the central cylinder 14.

The vibration actuator according to the present embodiment is configured as above, and therefore achieves the following effects.

(1) In the vibration actuator, sound is generated from the following three sources:

(a) a sliding face of the stator 11 and the rotor 13;
(b) the track faces 2d and 3a of the bearings; and
(c) the contact face 3b in contact with the wave washer 4.

In the present embodiment, the two track faces 2d and 3a of the bearings 1 are both arranged on the inner circumference of the rotor holder 2. The contact face 3b of the track body 3 in contact with the wave washer 4 is arranged on the inner circumference of the rotor holder 2.

Since the rotor holder 2 covers (b) and one face of (c) (the contact face 3b), the sound is blocked from being externally transmitted, thereby achieving sound attenuation.

(2) Since the track body 3 is made of plastic (plastic material), it is possible to attenuate the sound (b) generated from the bearings, as well as the sound (c) generated from the contact face 3b in contact with the wave washer 4.

Since the retainer 2a is made of plastic, it is possible to attenuate the sound (b) generated from the bearings 1.

Preferred examples of the plastic include thermosetting resin such as POM (polyacetal), PEEK (polyetheretherketone), PBT (polybutylene terephthalate), PC (polycarbonate), and ABS resin (acrylonitrile-butadiene-styrene copolymer synthetic resin).

(3) The sound (b) generated from the track faces 2d and 3a of the bearings was evaluated by changing the number of bearing steel balls 1b of the thrust bearing. As a result, the sound was louder when the number of bearing steel balls coincided with an integral multiple of the wave number of the progressive waves in the stator 11. Therefore, in the present embodiment, the sound is attenuated by preventing the number of the bearing steel balls 1b of the thrust bearing from coinciding with an integral multiple of the wave number of the progressive waves generated in the stator 11.

(4) The overall length of the vibration actuator could be reduced (for example, the conventional length of 25 to 30 mm could be reduced to 15 mm), as a result of arranging the track face 2d of the bearings of the rotor holder 2 closer to the stator 11 than the outer circumference flange 2a for receiving a rotor thrust of the rotor holder 2.

(5) Since the hollow central cylinder 14 has a hollow form, an optical path can pass through the inside thereof, the overall length of the vibration actuator to be used for an optical apparatus is reduced, and is also optimum for attenuating the sound.

As described above, the present embodiment achieves the effects that: the sound of the vibration actuator can be further attenuated; the overall length of the vibration actuator can be further reduced; and a moving image can be favorably taken with such an optical apparatus.

Modified Embodiment

Various variations and modifications are possible without being limited to the aforementioned embodiment, and are included within the technical scope of the present invention.

(1) Regarding the rotor holder 2, the track face 2d is the surface on the cylindrical member 2c side (inner side) of the inner circumference flange 2b.
Therefore, the sound can be further attenuated by applying a plastic thin plate to or forming a plastic layer on the track face 2d.

(2) A digital single-lens reflex camera has been described in the present embodiment; however, the present invention is not limited thereto, and is also applicable to a digital compact camera, a video camera, etc.

The invention claimed is:

1. A vibration actuator, comprising:
a vibrating element that is excited by an electromechanical conversion element;
a rotor portion that is relatively rotated by way of vibration of the vibrating element;
a pressing portion that generates a pressure force in a thrust direction between the vibrating element and the rotor portion;
a hollow rotor holder that restricts a position of the rotor portion in the thrust direction and a radial direction; and
a bearing member of which a rotation axis is coaxial with a rotation axis of the vibrating element, wherein
the rotor holder includes:
an outer circumference flange that is provided on an outer circumference thereof to receive the pressure force from the rotor portion; and
an inner circumference flange that is provided on an inner circumference thereof to serve as a first track face of the bearing member.

2. The vibration actuator according to claim 1, wherein:
the rotor holder has a cylindrical member between the outer circumference flange and the inner circumference flange, and
the first track face facing the bearing member as well as a second track face being opposite to the first track face are arranged at an inner circumference of the cylindrical member of the rotor holder.

3. The vibration actuator according to claim 2, further comprising:
a track member having the second track face facing the bearing member, wherein
a contact face between the pressing portion and the track member is arranged at the inner circumference of the cylindrical member of the rotor holder.

4. The vibration actuator according to claim 2, wherein:
at least one of the first and second track faces facing the bearing member is made of a plastic material.

5. The vibration actuator according to claim 4, wherein:
the second track face facing the bearing member is made of thermosetting resin.

6. The vibration actuator according to claim 1, further comprising:
a vibration absorber for absorbing the vibration of the rotor portion, the vibration absorber being provided between the rotor portion and the outer circumference flange of the rotor holder.

7. The vibration actuator according to claim 1, wherein:
a number of steel balls in the bearing member is not an integral multiple of a wave number of progressive waves generated in the vibrating element.

8. The vibration actuator according to claim 1, wherein:
the bearing member is a thrust bearing.

9. An optical apparatus, wherein:
an optical path is arranged within a hollow portion of the vibration actuator according to claim 1.

10. A vibration actuator comprising:
a vibrating element that is driven by an electromechanical conversion element;
a rotor that is rotated by the vibrating element;
a rotor holder that receives a pressure force from a rotor side; and
a support member that is in contact with a part of the rotor holder, wherein
the rotor holder includes: a first face that receives the pressure force from the rotor side, and a second face that is in contact with the support member, the second face being closer to a vibrating element side than the first face.

11. The vibration actuator according to claim 10, wherein:
the rotor holder is circular, and the first face receives the pressure force from the rotor closer to an outer circumference side of the rotor holder than the second face.

12. The vibration actuator according to claim 10, wherein:
the rotor holder is circular, and the second face is in contact with the support member closer to an inner circumference side of the rotor holder than the first face.

13. A lens barrel comprising the vibration actuator according to claim 10.

14. A vibration actuator comprising:
a vibrating element that is driven by an electromechanical conversion element;
a rotor that is rotated by the vibrating element;
a rotor holder that receives a pressure force from a rotor side; and
a support member that is rotated coaxially with a rotation axis of the rotor, wherein
the rotor holder includes: a first face that receives the pressure force from the rotor side, and a second face that is in contact with the support member, the second face being closer to a vibrating element side than the first face.

15. The vibration actuator according to claim 14, wherein:
the rotor holder is circular, and the first face receives the pressure force from the rotor closer to an outer circumference side of the rotor holder than the second face.

16. The vibration actuator according to claim 14, wherein:
the rotor holder is circular, and the second face is in contact with the support member closer to an inner circumference side of the rotor holder than the first face.

17. A lens barrel comprising the vibration actuator according to claim 14.

* * * * *